(12) United States Patent
Al-Qasim et al.

(10) Patent No.: US 11,760,919 B2
(45) Date of Patent: Sep. 19, 2023

(54) FOAMS FOR HYDROCARBON RECOVERY, WELLS INCLUDING SUCH, AND METHODS FOR USE OF SUCH

(71) Applicant: Saudi Arabian Oil Company, Dhahran (SA)

(72) Inventors: Abdulaziz S. Al-Qasim, Dammam (SA); Zuhair AlYousif, Saihat (SA); Abdulkarem Algadrah, Jubail (SA)

(73) Assignee: Saudi Arabian Oil Company, Dhahran (SA)

( * ) Notice: Subject to any disclaimer, the term of this patent is extended or adjusted under 35 U.S.C. 154(b) by 74 days.

(21) Appl. No.: 16/922,088

(22) Filed: Jul. 7, 2020

(65) Prior Publication Data

US 2022/0010196 A1    Jan. 13, 2022

(51) Int. Cl.
   *C09K 8/584* (2006.01)
   *C09K 8/594* (2006.01)
   *C09K 8/38* (2006.01)
   *E21B 43/16* (2006.01)

(52) U.S. Cl.
   CPC .......... *C09K 8/584* (2013.01); *C09K 8/38* (2013.01); *C09K 8/594* (2013.01)

(58) Field of Classification Search
   None
   See application file for complete search history.

(56) References Cited

U.S. PATENT DOCUMENTS

| | | |
|---|---|---|
| 4,525,287 A | 6/1985 | Carstensen |
| 4,873,008 A | 10/1989 | Landis et al. |
| 4,954,242 A | 9/1990 | Gruia |
| 4,961,839 A | 10/1990 | Stine et al. |
| 5,120,427 A | 6/1992 | Stine et al. |
| 5,139,644 A | 8/1992 | Gruia |
| 5,139,646 A | 8/1992 | Gruia |
| 5,296,132 A * | 3/1994 | Hart .............. B01D 19/0404 208/131 |
| 5,389,299 A * | 2/1995 | Hart .............. B01D 19/0404 201/9 |
| 6,624,124 B2 | 9/2003 | Garnier |

(Continued)

FOREIGN PATENT DOCUMENTS

| | | |
|---|---|---|
| EP | 0308651 A2 | 3/1989 |
| EP | 0770661 A1 | 5/1997 |

(Continued)

OTHER PUBLICATIONS

Danila et al. Formulation and characterization of some oil in water cosmetic emulsions Pure Appl. Chem. 2019, 91(9): 1493-1507 (Year: 2019).*

(Continued)

*Primary Examiner* — Charles R Nold
(74) *Attorney, Agent, or Firm* — DINSMORE & SHOHL LLP

(57) ABSTRACT

A foam for hydrocarbon recovery includes a gas phase and a liquid phase. The liquid phase includes a foaming mixture, and the foaming mixture includes an aqueous solution, one or more surfactants, and an oil mixture. At least 2 wt. % of the liquid phase includes the oil mixture. Also described are methods of recovering hydrocarbons from a deposit reservoir using such a foam, as well as a hydrocarbon well including such a foam.

18 Claims, 4 Drawing Sheets

(56) References Cited

U.S. PATENT DOCUMENTS

| | | | |
|---|---|---|---|
| 6,806,235 | B1 | 10/2004 | Mueller et al. |
| 7,373,977 | B1 | 5/2008 | Berger et al. |
| 8,343,334 | B2 | 1/2013 | Koseoglu |
| 8,403,051 | B2 | 3/2013 | Huang et al. |
| 8,828,219 | B2 | 9/2014 | Koseoglu |
| 8,877,040 | B2 | 11/2014 | Hoehn et al. |
| 9,023,192 | B2 | 5/2015 | Koseoglu |
| 9,388,347 | B2 | 7/2016 | Ramaseshan et al. |
| 9,394,493 | B2 | 7/2016 | Koseoglu |
| 9,534,179 | B2 | 1/2017 | Koseoglu |
| 9,580,663 | B2 | 2/2017 | Low et al. |
| 9,663,732 | B2 | 5/2017 | Ganyu |
| 9,701,912 | B2 | 7/2017 | Hoehn et al. |
| 9,783,748 | B2 | 10/2017 | Harvey et al. |
| 9,914,889 | B2 | 3/2018 | Hoehn et al. |
| 9,944,863 | B2 | 4/2018 | Zhang et al. |
| 10,011,786 | B1 | 7/2018 | Eizenga et al. |
| 10,053,619 | B2 | 8/2018 | Saboowala et al. |
| 10,301,560 | B2 | 5/2019 | Wang et al. |
| 10,435,635 | B2 | 10/2019 | Hoehn et al. |
| 10,533,142 | B2 | 1/2020 | Sauge et al. |
| 2004/0127581 | A1* | 7/2004 | Baran, Jr. ............. C08J 9/32 516/115 |
| 2005/0202097 | A1 | 9/2005 | Maskin |
| 2007/0042913 | A1* | 2/2007 | Hutchins ............. C09K 8/685 507/269 |
| 2007/0129257 | A1* | 6/2007 | Kippie ............. C09K 8/36 507/102 |
| 2007/0287636 | A1 | 12/2007 | Heller et al. |
| 2008/0161207 | A1* | 7/2008 | Welton ............. C09K 8/805 507/209 |
| 2011/0071060 | A1* | 3/2011 | Nguyen ............. C09K 8/38 507/265 |
| 2013/0109879 | A1 | 5/2013 | Berger et al. |
| 2015/0159071 | A1 | 6/2015 | Massey et al. |
| 2016/0347990 | A1* | 12/2016 | Vanzin ............. C09K 8/602 |
| 2017/0121585 | A1 | 5/2017 | Hossain |
| 2017/0137689 | A1 | 5/2017 | Deroo |
| 2017/0198201 | A1 | 7/2017 | Chang |
| 2018/0057732 | A1 | 3/2018 | Babcock |
| 2018/0223167 | A1 | 8/2018 | Al-Yami et al. |
| 2018/0223175 | A1 | 8/2018 | Al-Yami et al. |
| 2010/8034679 | | 12/2018 | Abdel-Fattah et al. |
| 2018/0346798 | A1 | 12/2018 | Abdel-Fattah et al. |
| 2019/0048287 | A1 | 2/2019 | Long et al. |
| 2019/0055459 | A1 | 2/2019 | Zelenev et al. |

FOREIGN PATENT DOCUMENTS

| | | |
|---|---|---|
| JP | 4567445 B2 | 10/2010 |
| RU | 2623380 C1 | 6/2017 |
| WO | 2004053016 A1 | 6/2004 |
| WO | 2004101955 A1 | 11/2004 |
| WO | 2010065634 A2 | 6/2010 |
| WO | 2015033281 A1 | 3/2015 |
| WO | 2015135777 A2 | 9/2015 |
| WO | 2016138072 A1 | 9/2016 |
| WO | 2018005341 A1 | 1/2018 |
| WO | 2018081063 A1 | 5/2018 |
| WO | 2018144277 A1 | 8/2018 |
| WO | 2019175649 A1 | 9/2019 |
| WO | 2021091631 A1 | 5/2021 |

OTHER PUBLICATIONS

U.S. Office Action dated Jul. 20, 2021 pertaining to U.S. Appl. No. 16/672,967, filed Nov. 4, 2019, 10 pages.

Dubois, V. et al., "Fatty acid profiles of 80 vegetable oils with regard to their nutritional potential", Eur. J. Lipid Sci. Technol. 109 (2007), pp. 710-732 (Year: 2007).

Product data sheets of linolenic acid by Sigma-Aldrich (Year: 2020).

Product data sheets of linoleic acid by Millipore-Sigma (Year: 2020).

Office Action dated Aug. 18, 2020 pertaining to U.S. Appl. No. 16/672,967, filed Nov. 4, 2019, 8 pgs.

Busson-Breysse, "Jojoba wax: Its esters and some of its minor components", Journal of the American Oil Chemists' Society, vol. 71, No. 9, pp. 999-1002, Sep. 1994.

International Search Report and Written Opinion dated Apr. 1, 2021 pertaining to International application No. PCT/US2020/066302 filed Dec. 21, 2020, 14 pgs.

International Search Report and Written Opinion dated Jan. 21, 2021 pertaining to International application No. PCT/US2020/053253 filed Sep. 29, 2020, 18 pgs.

Youssif, Ahmed A A et al. "Production of Bio Lubricant from Jojoba Oil Synthesis and Characteristic of Carboxymethyl Cellulose from Baobab (*Adansonia digitata* L.) Fruit Shell View project", International Journal of Engineering Innovation & Research vol. 8, Issue 4, ISSN: 2277-5668, Jul. 17, 2019, pp. 146-153.

Abobatta, Waleed F. "Simmondsia chinensis Jojoba tree", Journal of Advanced Trends in Basic and Applied Science, vol. 1, No. 1: 160-165, 2017.

Office Action dated Nov. 24, 2020 pertaining to U.S. Appl. No. 16/672,967, filed Nov. 4, 2019, 11 pgs.

Andersson et al., "First-Principles Prediction of Liquid/Liquid Interfacial Tension", Journal of Chemical Theory and Computation, vol. 10, pp. 3401-3408, May 28, 2014.

Rudyk et al., "Supercritical carbon dioxide extraction of oil sand enhanced by water and alcohols as Co-solvents", Journal of CO2 Utilization, vol. 17, pp. 90-98, 2017.

Veronina et al., "Physical foaming of fluorinated ethylene-propylene (FEP) copolymers in supercritical carbon dioxide: single-film fluoropolymer piezoelectrets", Applied Physics A, vol. 90, pp. 615-618, 2008.

Zhang et al., "Dissolution of surfactants in supercritical CO2 with co-solvents", Chemical Engineering Research and Design, vol. 94, pp. 624-631, 2015.

International Search Report and Written Opinion dated Jan. 27, 2022 pertaining to International application No. PCT/US2021/052769 filed Sep. 30, 2021, 15 pages.

U.S. Office Action dated Feb. 3, 2022 pertaining to U.S. Appl. No. 17/183,802, filed Feb. 24, 2021, 24 pages.

U.S. Office Action dated Dec. 8, 2021 pertaining to U.S. Appl. No. 17/073,741, filed Oct. 19, 2020, 32 pages.

U.S. Notice of Allowance and Fee(s) Due dated Nov. 15, 2021 pertaining to U.S. Appl. No. 16/672,967, filed Nov. 4, 2019, 10 pages.

U.S. Notice of Allowance and Fee(s) Due dated Mar. 29, 2022 pertaining to U.S. Appl. No. 17/073,741, filed Oct. 19, 2020, 24 pages.

International Search Report and Written Opinion dated Feb. 28, 2022 pertaining to International application No. PCT/US2021/054360 filed Oct. 11, 2021, 14 pages.

U.S. Office Action dated Oct. 28, 2022 pertaining to U.S. Appl. No. 17/489,897, filed Sep. 30, 2021, 15 pages.

\* cited by examiner

FOAMS FOR HYDROCARBON RECOVERY, WELLS INCLUDING SUCH, AND METHODS FOR USE OF SUCH

BACKGROUND

Field

The present disclosure relates to hydrocarbon recovery from subsurface reservoirs and, more specifically, to foams that can be used in enhanced oil recovery applications.

Background

The discovery and extraction of hydrocarbons, such as oil or natural gas, from subterranean formations may be impeded for a variety of reasons, such as permeability variations or damage within the formation. The production rate of hydrocarbons from a hydrocarbon-producing region of the formation may be reduced compared to the expected production rate as a result of these impediments. In these instances, methods for obtaining enhanced oil recovery from the hydrocarbon-producing regions of the formation can be utilized to improve hydrocarbon production.

Enhanced oil recovery (EOR) may be performed by multiple techniques, one of which is gas injection (gas EOR). Gas EOR has enjoyed success in drilling operations in various locations. Despite the reported successes of gas EOR, however, a major challenge facing this technique is poor volumetric sweep efficiency, which is one measure of the effectiveness of the EOR technique used in a hydrocarbon recovery operation. Major factors that contribute to this problem are the low density and viscosity of injected gas relative to reservoir fluids, as well as reservoir heterogeneity, such as high permeability and heavily fractured zones. The high mobility of injected gas compared with the other fluids in reservoirs may lead to early breakthrough of gas, leaving most of the residual and trapped oil untouched and increasing the gas-to-oil ratio (GOR), which makes the overall technique inefficient.

BRIEF SUMMARY

The use of foams comprising gas and a liquid phase is one of the most promising techniques to overcome gas mobility challenges in petroleum reservoirs and improve the volumetric sweep efficiency. Foam can reduce the gas mobility in petroleum reservoirs by increasing the gas's apparent viscosity and reducing the relative permeability of the gas. In turn, reduced gas mobility generally may improve the volumetric sweep efficiency.

However, more effective gas EOR techniques are desired. It has been discovered that the addition of an oil mixture to a liquid phase that includes a surfactant formulation used for foam formation may result in improved foam stability. Foam stability plays an important role in a number of applications related to improved volumetric sweep efficiency. The present disclosure is directed to surfactant-stabilized foams that include an oil mixture, methods of recovering hydrocarbons using such surfactant-stabilized foams that include oil mixtures, and hydrocarbon wells including the surfactant-stabilized foams that include oil mixtures. Unexpectedly, it has been found that the addition of such oil mixtures into liquid phases of foams may improve foaming and enhance oil recovery.

In accordance with one or more embodiments of the present disclosure, a foam suitable for use in hydrocarbon recovery may include a gas phase and a liquid phase. The liquid phase may include a foaming mixture, and the foaming mixture may include an aqueous solution, one or more surfactants, and an oil mixture. The liquid phase may include at least 2 weight % (wt. %) of the oil mixture.

In accordance with one or more embodiments of the present disclosure, a method of recovering hydrocarbons from a deposit reservoir may include contacting the deposit reservoir with a gas phase and a liquid phase, generating a foam comprising the gas phase and the liquid phase, and collecting the hydrocarbons displaced by the foam. The liquid phase may include a foaming mixture, and the foaming mixture may include an aqueous solution, one or more surfactants, and an oil mixture. The liquid phase may include at least 2 wt. % of the oil mixture.

In accordance with yet more embodiments of the present disclosure, a hydrocarbon well may include a subsurface reservoir, a borehole, and a foam. The foam may include a gas phase and a liquid phase. The liquid phase may include a foaming mixture, and the foaming mixture may include an aqueous solution, one or more surfactants, and an oil mixture. The liquid phase may include at least 2 wt. % of the oil mixture.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

FIGURES (FIGS.) 1A-1D provide a photographic time-lapse of foams produced, according to one or more embodiments presently described (FIG. 1A provides an image of the foams immediately after shaking, FIG. 1B provides an image of the foams after being allowed to rest for about 1 hour, FIG. 1C provides an image of the foams after being allowed to rest for about 2 hours, FIG. 1D provides an image of the foams after being allowed to rest for about 4 hours).

DETAILED DESCRIPTION

Figure 1A:
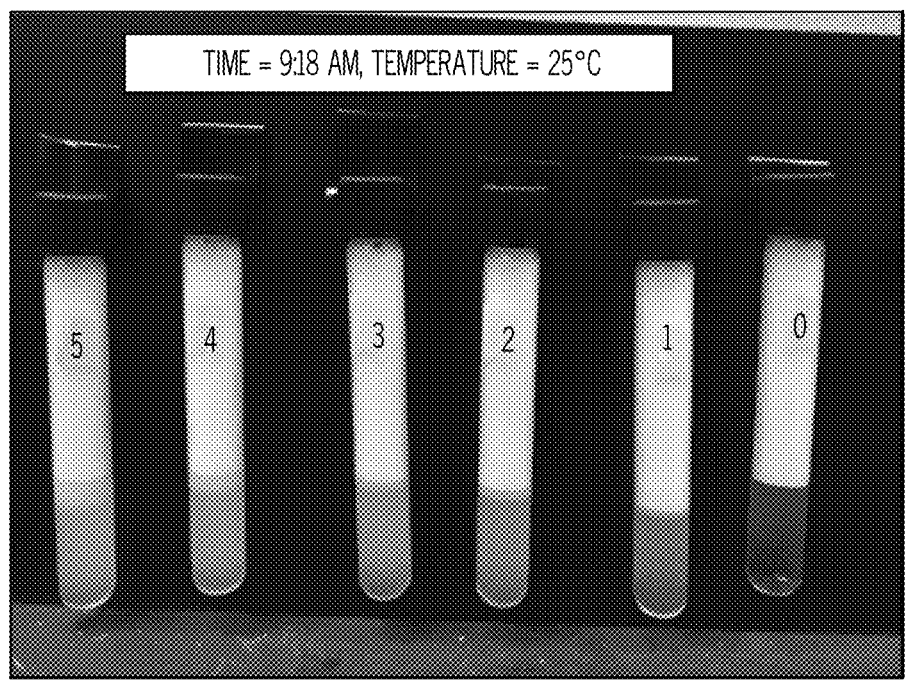

Embodiments of the present disclosure are directed to foams that may be suitable for use in hydrocarbon recovery from deposit reservoirs. Additional embodiments, of the present disclosure are further directed to methods of using such foams for hydrocarbon recovery from deposit reservoirs. Additionally, some embodiments of the present disclosure are directed to hydrocarbon wells that may include a subsurface reservoir, a borehole, and such foams.

According to one or more embodiments of the present disclosure, a foam that may be suitable for use in hydrocarbon recovery is provided that may include a gas phase and a liquid phase. As used herein, the term "foam" refers to a substance composed of pockets of gas trapped in a liquid phase. As used herein, the term "foam quality" refers to the volume of gas phase divided by the total volume of the gas and liquid phases multiplied by 100%. The liquid phase may include a foaming mixture, and the foaming mixture may include an aqueous solution, one or more surfactants, and an oil mixture. The liquid phase may include at least 2 wt. % of the oil mixture. Stated differently, the oil mixture may comprise at least 2 wt. % of the liquid phase.

In embodiments, the foam suitable for use in hydrocarbon recovery may include the gas phase in a concentration from 30 volume % (vol. %) to 99 vol. %. For instance, the foam may include the gas phase in a concentration from 35 vol. % to 90 vol. %, from 40 vol. % to 85 vol. %, from 45 vol. % to 80 vol. %, from 50 vol. % to 75 vol. %, or even from 55 vol. % to 70 vol. %. In the same or different embodiments, the foam suitable for use in hydrocarbon recovery may include the liquid phase in a concentration from 1 vol. % to 70 vol. %. For instance, the foam may include the liquid phase in a concentration from 10 vol. % to 65 vol. %, from 15 vol. % to 60 vol. %, from 20 vol. % to 55 vol. %, from 25 vol. % to 50 vol. %, or even from 30 vol. % to 45 vol. %. In some embodiments, the sum of the concentrations of the gas phase and the liquid phase may be 100 vol. %, but it is envisioned that the sum may be less than 100 vol. % due to the presence of other components of the foam that are not soluble in either the gas phase or the liquid phase.

In one or more embodiments, the gas phase may include at least 90 mole % (mol. %), at least 91 mol. %, at least 92 mol. %, at least 93 mol. %, at least 94 mol. %, at least 95 mol. %, at least 96 mol. %, at least 97 mol. %, at least 98 mol. %, or even at least 99 mol. % of air, $CO_2$, $N_2$, or mixtures of two or more thereof. In one or more embodiments, the gas phase may consist of air, $CO_2$, $N_2$, or mixtures of two or more thereof.

In one or more embodiments, the liquid phase comprises a foaming mixture. The foaming mixture may comprise an aqueous solution, one or more surfactants, and an oil mixture. In one or more embodiments, the foaming mixture may comprise at least 1 vol. %, at least 10 vol. %, at least 20 vol. %, at least 30 vol. %, at least 40 vol. %, at least 50 vol. %, or even at least 60 vol. % of the liquid phase. In embodiments, the foaming mixture may comprise the aqueous solution in a concentration of from 1 vol. % to 70 vol. %, from 5 vol. % to 65 vol. %, from 10 vol. % to 60 vol. %, from 15 vol. % to 55 vol. %, from 20 vol. % to 50 vol. %, from 25 vol. % to 45 vol. %, or even from 30 vol. % to 40 vol. %. For example, the foaming mixture may comprise the aqueous solution in a concentration of at least 1 vol. %, at least 5 vol. %, at least 10 vol. %, at least 15 vol. %, at least 20 vol. %, at least 25 vol. %, at least 30 vol. %, at least 35 vol. %, at least 40 vol. %, at least 45 vol. %, at least 50 vol. %, at least 55 vol. %, at least 60 vol. %, or even at least 65 vol. %.

In one or more embodiments, the aqueous solution may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the aqueous solution may comprise at least 80 wt. %, at least 90 wt. %, at least 95 wt. %, at least 99 wt. %, or even at least 99.9 wt. % of water.

In one or more embodiments, at least 90 wt. %, at least 95 wt. %, or even at least 99 wt. % of the aqueous mixture by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

In one or more embodiments, the foaming mixture further comprises one or more surfactants. In embodiments, the foaming mixture may comprise the surfactant in a concentration of from 1 gallon of surfactant per 1000 gallons of aqueous mixture ("1 gpt") to 20 gallons of surfactant per 1000 gallons of aqueous ("20 gpt"). For instance, the foaming mixture may comprise the surfactant in a concentration of from 2 gpt to 19 gpt, from 3 gpt to 18 gpt, from 4 gpt to 17 gpt, from 5 gpt to 16 gpt, from 6 gpt to 15 gpt, from 7 gpt to 14 gpt, from 8 gpt to 13 gpt, from 9 gpt to 12 gpt, or even from 10 gpt to 11 gpt. In embodiments, the foaming mixture may comprise the surfactant in a concentration of from 5 gpt to 15 gpt or from 8 gpt to 12 gpt or from 9 gpt to 11 gpt. In other embodiments, the foaming mixture may comprise the surfactant in a concentration of from 0.02 wt. % to 1.2 wt. %, from 0.1 wt. % to 1.1 wt. %, from 0.2 wt. % to 1 wt. %, from 0.3 wt. % to 0.9 wt. %, from 0.4 wt. % to 0.8 wt. %, from 0.5 wt. % to 0.7 wt. %, or even from 0.55 wt. % to 0.65 wt. %. For instance, the foaming mixture may comprise the surfactant in a concentration of at least 0.02 wt. %, at least 0.04 wt. %, at least 0.06 wt. %, at least 0.08 wt. %, at least 0.1 wt. %, at least 0.12 wt. %, at least 0.14 wt. %, at least 0.16 wt. %, 0.18 wt. %, at least 0.2 wt. %, at least 0.22 wt. %, at least 0.24 wt. %, at least 0.26 wt. %, at least 0.28 wt. %, at least 0.3 wt. %, at least 0.32 wt. %, at least 0.34 wt. %, at least 0.36 wt. %, at least 0.38 wt. %, at least 0.4 wt. %, at least 0.45 wt. %, at least 0.5 wt. %, at least 0.55 wt. %, at least 0.6 wt. %, at least 0.65 wt. %, at least 0.7 wt. %, at least 0.75 wt. %, at least 0.8 wt. %, at least 0.85 wt. %, at least 0.9 wt. %, at least 0.95 wt. %, at least 1 wt. %, at least 1.05 wt. %, at least 1.1 wt. %, or even at least 1.15 wt. %.

The one or more surfactants may include, for example, an amphoteric surfactant, a zwitterionic surfactant, an anionic surfactant, a cationic surfactant, a nonionic surfactant, or a combination of two or more of the preceding types of surfactants.

In one or more embodiments, the surfactant may be an amphoteric surfactant. For example, the surfactant may be an amphoteric alkyl amine. According to additional embodiments, the surfactant may be a mixture of multiple components. For instance, the surfactant may comprise a mixture of an amphoteric alkyl amine and an alcoholic solvent.

In one or more embodiments, such solvents may include one or more of an alcohol having from 1 to 15 carbon atoms in its carbon chain. For example, the alcoholic solvent may include one or more of methanol, ethanol, propanol, butanol, pentanol, hexanol, heptanol, octanol, nonanol, decanol, undecanol, dodecanol, tridecanol, tetradecanol, or pentadecanol. The alcohol may be a primary alcohol. For example, the alcohol may be one or more of methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, or 1-pentadecanol. Further, the C1-C15 chain may also include hydrocarbon branches that are not included in the number of carbon atoms, i.e. not included in the from 1 to 15 carbon atoms. In other embodiments, the alcohol may be a secondary alcohol. For instance, the alcohol may be one or more of propan-2-ol, butan-2-ol, pentan-2-ol, or pentan-3-ol. In other embodiments, the alcohol may be a tertiary alcohol. For instance, the alcohol may be 2-methyl-2-propanol.

According to additional embodiments, one or more of the surfactants may be a zwitterionic surfactant. According to additional embodiments, one or more of the surfactants may be an anionic surfactant. According to additional embodiments, one or more of the surfactants may be a cationic surfactant. According to additional embodiments, one or more of the surfactants may be a nonionic surfactant.

In one or more embodiments, the surfactant may not be a surfactant comprising Formula (I):

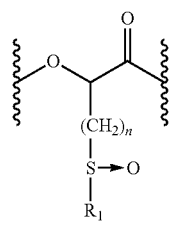

(I)

In Formula (I), $R^1$ is alkyl, substituted alkyl, alkenyl, substituted alkenyl, aryl, or substituted aryl; and n is an integer from 1 to 20.

In one or more embodiments, the foaming mixture further comprises an oil mixture, which may comprise from 2 wt. % to 15 wt. % of the liquid phase. For instance, the liquid phase may comprise at least 2 wt. %, at least 3 wt. %, at least 4 wt. %, at least 5 wt. %, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, at least 15 wt. %, or any fractional part thereof, of the oil mixture. Thus, the liquid phase may comprise from 2 wt. % to 15 wt. %, from 3 wt. % to 14 wt. %, from 4 wt. % to 13 wt. %, from 5 wt. % to 12 wt. %, from 6 wt. % to 11 wt. %, from 7 wt. % to 10 wt. %, or even from 8 wt. % to 9 wt. % of the oil mixture.

Without intending to be bound by any particular theory, it is believed that enhancement of foam stabilization may be due to one, two, or all three of the following potential mechanisms. The oil mixture may increase the maximum pressure of coalescence, which is a factor of the interfacial tension at the three interfaces of the foams described herein: oil-aqueous, gas-oil, and gas-aqueous. The oil mixture may increase the viscosity of the thin film forming the interface between the gas and liquid phases thereby delaying the thin film's drainage and improving the foam stabilization. The oil mixture may affect the chemical properties of the surfactant in a manner that influences foam stabilization.

In one or more embodiments, the oil mixture may comprise, among other components, one or more fatty acids, such as 11-eicosenoic acid, oleic acid, and erucic acid. For instance, the oil mixture may comprise from 65 mol. % to 80 mol. % 11-eicosenoic acid, from 5 mol. % to 15 mol. % oleic acid, and from 10 mol. % to 20 mol. % erucic acid.

The oil mixture may comprise 11-eicosenoic acid in a concentration ranging from 65 mol. % to 80 mol. %, from 68 mol. % to 79 mol. %, from 72 mol. % to 78 mol. %, or even from 76 mol. % to 77 mol. %.

The oil mixture may comprise oleic acid in a concentration ranging from 5 mol. % to 15 mol. %, from 6 mol. % to 14 mol. %, from 7 mol. % to 13 mol. %, from 8 mol. % to 12 mol. %, from 9 mol. % to 11 mol. %, or even from 9 mol. % to 10 mol. %.

The oil mixture may comprise erucic acid in a concentration ranging from 10 mol. % to 20 mol. %, from 11 mol. % to 19 mol. %, from 12 mol. % to 18 mol. %, from 13 mol. % to 17 mol. %, from 13 mol. % to 16 mol. %, from 13 mol. % to 15 mol. %, from 12 mol. % to 14 mol. %, or even from 12 mol. % to 13 mol. %. In one or more embodiments, the oil mixture may comprise erucic acid in a concentration ranging from 10 mol. % to 15 mol. %, from 11 mol % to 14 mol. %, or even from 12 mol. % to 13 mol. %.

According to additional embodiments, the oil mixture is naturally derived and may comprise, for example, jojoba oil, castor oil, cactus oil, almond oil, or a mixture of one or more of these. As described presently, naturally derived oils refer to single oils and mixtures of oils in which at least a portion of the oil is derived from a plant. Additionally, the oil mixture may be further diluted, thus lowering the concentration of the individual fatty acids in the oil mixture, or winterized, thus concentrating the fatty acids in the oil mixture, before using it in the foaming mixture.

Although the fatty acid content of jojoba oil may vary significantly depending on many known variables, such as the soil composition in which the plant is grown and when in the plant's lifecycle it is harvested, a typical jojoba oil fatty acid composition is shown in Table 1. In one or more embodiments, the oil mixture may comprise one or more of the components of Table 1 in amounts defined by ranges that include plus or minus 5 mol. %, 4 mol. %, 3 mol. %, 2 mol. %, or 1 mol. % of the amounts listed in Table 1.

TABLE 1

| Fatty Acid | Mol. % |
| --- | --- |
| Palmitic acid | 0.3 |
| Palmitoleic acid | 0.3 |
| Stearic acid | 0.2 |
| Oleic acid | 9.3 |
| Arachidic acid | — |
| 11-Eicosenoic acid | 76.7 |
| Behenic acid | trace |
| Erucic acid | 12.1 |
| Lignoceric acid | 0.1 |
| Nervonic acid | 1 |

Castor oil is a vegetable oil pressed from castor beans. A typical castor oil fatty acid composition is shown in Table 2.

TABLE 2

| Fatty Acid | Wt. % |
| --- | --- |
| Ricinoleic acid | 85-95 |
| Oleic acid | 2-6 |
| Linoleic acid | 1-5 |
| α-Linolenic acid | 0.5-1 |
| Stearic acid | 0.5-1 |
| Palmitic acid | 0.5-1 |
| Dihydroxystearic acid | 0.3-0.5 |
| Others | 0.2-0.5 |

In one or more embodiments, the oil mixture may comprise, among other components, one or more fatty acids, such as ricinoleic acid and oleic acid. For instance, the oil mixture may comprise from 85 wt. % to 95 wt. % ricinoleic acid and from 2 wt. % to 6 wt. % oleic acid.

The oil mixture may comprise ricinoleic acid in a concentration ranging from 85 wt. % to 95 wt. %, from 86 wt.

% to 94 wt. %, from 87 wt. % to 93 wt. %, from 88 wt. % to 92 wt. %, or even from 89 wt. % to 91 wt. %.

The oil mixture may comprise oleic acid in a concentration ranging from 2 wt. % to 6 wt. %, 3 wt. % to 5 wt. %, or even from 3.5 wt. % to 4.5 wt. %.

Cactus oil is extracted from the seeds of a species of cactus. A typical cactus oil fatty acid composition is predominantly a mixture of oleic acid, at about 13-24 wt. %, and linoleic acid, at about 55-65 wt. %.

The oil mixture may comprise oleic acid in a concentration ranging from 13 wt. % to 24 wt. %, from 14 wt. % to 23 wt. %, from 15 wt. % to 22 wt. %, from 16 wt. % to 21 wt. %, from 17 wt. % to 20 wt. %, or even from 18 wt. % to 19 wt. %.

The oil mixture may comprise linoleic acid in a concentration ranging from 55 wt. % to 65 wt. %, from 56 wt. % to 64 wt. %, from 57 wt. % to 63 wt. %, from 58 wt. % to 62 wt. %, from 59 wt. % to 61 wt. %, or even from 59.5 wt. % to 60.5 wt. %.

Sweet almond oil may be extracted from the kernel of almonds. A typical fatty acid composition of sweet almond oil is provided in Table 3.

TABLE 3

| Fatty Acid | Wt. % |
| --- | --- |
| Oleic acid | 25-35 |
| Linoleic acid | 10-20 |
| Saturated fatty acids | 5-15 |

In one or more embodiments, the oil mixture may comprise, among other components, one or more fatty acids, such as oleic acid and linoleic acid. For instance, the oil mixture may comprise from 25 wt. % to 35 wt. % oleic acid and from 10 wt. % to 20 wt. % linoleic acid.

The oil mixture may comprise oleic acid in a concentration ranging from 25 wt. % to 35 wt. %, from 26 wt. % to 34 wt. %, from 27 wt. % to 33 wt. %, from 28 wt. % to 32 wt. %, or even from 29 wt. % to 31 wt. %.

The oil mixture may comprise linoleic acid in a concentration ranging from 10 wt. % to 20 wt. %, from 11 wt. % to 19 wt. %, from 12 wt. % to 18 wt. %, from 13 wt. % to 17 wt. %, or even from 14 wt. % to 16 wt. %.

In one or more embodiments, the oil mixture comprises jojoba oil. In one or more embodiments, the oil mixture is all naturally derived jojoba oil or a portion of naturally derived jojoba oil, meaning at least a portion of the oil mixture is oil derived from the jojoba plant. The jojoba plant may be naturally occurring or be a cultivated variety.

Not all naturally occurring oils increase foam stability. For instance, watercress oil, glycerin, wheat protein, rose oil, mustard oil, bitter almond oil, and sesame oil did not produce any noticeable foam stability improvement. Without intending to be bound by any particular theory, it is believed that such oils may infiltrate the thin water film separating adjacent gas bubbles of the foam, thereby decreasing the maximum capillary pressure of coalescence. In addition to the infiltration of the oil into the thin water film, the surfactant also contributes to lowering the oil-water interfacial tension, eventually forming an oil-in-water emulsion, and destabilizing the foam.

In embodiments, the foam quality as defined herein may range from 15% to 99%. For instance, the foam quality may range from 15% to 90%, from 20% to 85%, from 25% to 80%, from 30% to 75%, from 35% to 70%, from 40% to 65%, from 45% to 60%, or even from 50% to 55%. Without being bound by theory, it is believed that the foaming results might be different depending on the foaming agent, aqueous phase, type of gas, and experimental conditions.

According to additional embodiments, a method of recovering hydrocarbons from a deposit reservoir may include contacting the deposit reservoir with a gas phase and a liquid phase, generating a foam comprising the gas phase and the liquid phase, and collecting the hydrocarbons displaced by the foam. The liquid phase may include a foaming mixture, and the foaming mixture may include an aqueous solution, one or more surfactants, and an oil mixture. The liquid phase may include at least 2 wt. % of the oil mixture. The gas phase and the liquid phase are as described above.

As used herein, the term "hydrocarbons" refers to substances formed from hydrogen and carbon atoms. Other atoms may also be present, such as oxygen, sulfur, and nitrogen, for example.

As used herein, the term "deposit reservoir" refers to a subsurface pool of hydrocarbons contained in porous or fractured rock formations.

The foam is generated by mixing the gas phase and the liquid phase containing the foaming mixture. Foam formation requires surface active components that reduce the surface tension and mechanical agitation to increase the surface area. As described above, in addition to other components, the liquid phase includes at least one surfactant, which is a surface active agent. As the gas phase is added to the liquid phase, the liquid phase is agitated by the flow of gas.

The deposit reservoir may be contacted by the foam, driving out hydrocarbons contained in the deposit reservoir. Without intending to be bound to any particular theory, it is believed that the foam increases the sweep efficiency, as described above, of the gas phase by displacing the hydrocarbons from the rock formation and driving them toward a collection point.

In one or more embodiments, generating the foam and contacting the deposit reservoir may be performed in either order or even simultaneously. The foam may be generated followed by contacting the deposit reservoir with the foam, or the reservoir may be contacted with the gas phase and the liquid phase followed by generating the foam. In other embodiments, the foam may form as the gas phase and the liquid phase contact the deposit reservoir.

According to additional embodiments, a hydrocarbon well may include a subsurface reservoir, a borehole, and a foam. The foam may include a gas phase and a liquid phase. The liquid phase may include a foaming mixture, and the foaming mixture may include an aqueous solution, one or more surfactants, and an oil mixture. The liquid phase may include at least 2 wt. % of the oil mixture. The gas phase and the liquid phase are as described above. As used herein, the term "borehole" refers to an opening in the ground that provides access to a subsurface reservoir.

According to a first aspect, either alone or in combination with any other aspect, a foam suitable for use in hydrocarbon recovery includes a gas phase and a liquid phase comprising a foaming mixture. The foaming mixture comprises an aqueous solution, one or more surfactants, and an oil mixture comprising at least 2 wt. % of the liquid phase.

According to a second aspect, either alone or in combination with any other aspect, a method of recovering hydrocarbons from a deposit reservoir includes contacting the deposit reservoir with a gas phase and a liquid phase; generating a foam comprising the gas phase and the liquid phase; and collecting the hydrocarbons displaced by the foam. The liquid phase includes a foaming mixture. The foaming mixture comprises an aqueous solution, one or more surfactants, and an oil mixture comprising at least 2 wt. % of the liquid phase.

According to a third aspect, either alone or in combination with any other aspect, a hydrocarbon well includes a subsurface reservoir, a borehole, and a foam comprising a gas phase and a liquid phase comprising a foaming mixture. The foaming mixture comprises an aqueous solution, one or more surfactants, and an oil mixture comprising at least 2 wt. % of the liquid phase.

According to a fourth aspect, either alone or in combination with any other aspect, the oil mixture comprises at least 11-eicosenoic acid, oleic acid, and erucic acid.

According to a fifth aspect, either alone or in combination with any other aspect, the oil mixture comprises: from 65 mol. % to 80 mol. % 11-eicosenoic acid; from 5 mol. % to 15 mol. % oleic acid; and from 10 mol. % to 20 mol. % erucic acid.

According to a sixth aspect, either alone or in combination with any other aspect, the oil mixture is all naturally derived jojoba oil or a portion of naturally derived jojoba oil.

According to a seventh aspect, either alone or in combination with any other aspect, the oil mixture is in a concentration of less than or equal to 15 wt. % of the liquid phase.

According to an eighth aspect, either alone or in combination with any other aspect, at least 99 wt. % of the aqueous mixture is brine.

According to a ninth aspect, either alone or in combination with any other aspect, the gas phase comprises at least 90 mol. % of air, $CO_2$, $N_2$, or mixtures of two or more of these.

According to a tenth aspect, either alone or in combination with any other aspect, one or more of the surfactants is an amphoteric surfactant.

According to an eleventh aspect, either alone or in combination with any other aspect, one or more of the surfactants is an amphoteric alkyl amine.

According to a twelfth aspect, either alone or in combination with any other aspect, one or more of the surfactants is an amphoteric alkyl amine and another one of the one or more surfactants is propan-2-ol.

According to a thirteenth aspect, either alone or in combination with any other aspect, the one or more surfactants is not a surfactant comprising Formula (I):

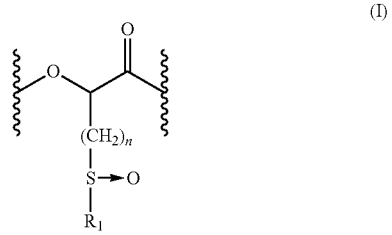

(I)

where $R^1$ is alkyl, substituted alkyl, alkenyl, substituted alkenyl, aryl, or substituted aryl; and n is an integer from 1 to 20.

According to a fourteenth aspect, either alone or in combination with any other aspect, the oil mixture has a concentration of from 2 wt. % to 15 wt. % of the liquid phase.

According to a fifteenth aspect, either alone or in combination with any other aspect, the oil mixture has a concentration of greater than or equal to 10 wt % of the liquid phase.

According to a sixteenth aspect, either alone or in combination with any other aspect, the oil mixture has a concentration from 4 wt. % to 13 wt. % of the liquid phase.

According to a seventeenth aspect, either alone or in combination with any other aspect, the generating of the foam precedes the contacting of the deposit reservoir.

According to an eighteenth aspect, either alone or in combination with any other aspect, the contacting of the deposit reservoir precedes the generating of the foam.

According to an nineteenth aspect, either alone or in combination with any other aspect, the oil mixture comprises at least 11-eicosenoic acid, oleic acid, and erucic acid.

EXAMPLE

Using the embodiments of the present disclosure, foams were produced that exemplify the attributes presently described. It should be understood that the ensuing Examples are illustrative of one or more embodiments presently disclosed and should not be construed as in any way as limiting on the appended claims or other portions of the present application.

Foams were prepared by combining seawater, jojoba oil, and the surfactant in a 13 ml glass tube. The surfactant concentration was fixed throughout the entire study at 10 gallons per thousand gallons (gpt) of solution. The 13 ml glass tubes were filled with 4 grams (g) of prepared solutions such that the seawater contained 10 gpt of the surfactant (a mixture of an amphoteric alkyl amine and propan-2-ol). Different concentrations of jojoba oil, as provided in Table 4, were then added. The solutions were shaken several times to generate foams.

TABLE 4

| Sample No. | Jojoba mass (g) | Jojoba Wt. % |
|---|---|---|
| 0 | 0.0 | 0 |
| 1 | 0.1 | 2.4 |
| 2 | 0.2 | 4.8 |
| 3 | 0.3 | 7 |
| 4 | 0.4 | 9 |
| 5 | 0.5 | 11.1 |

Figure 1B:
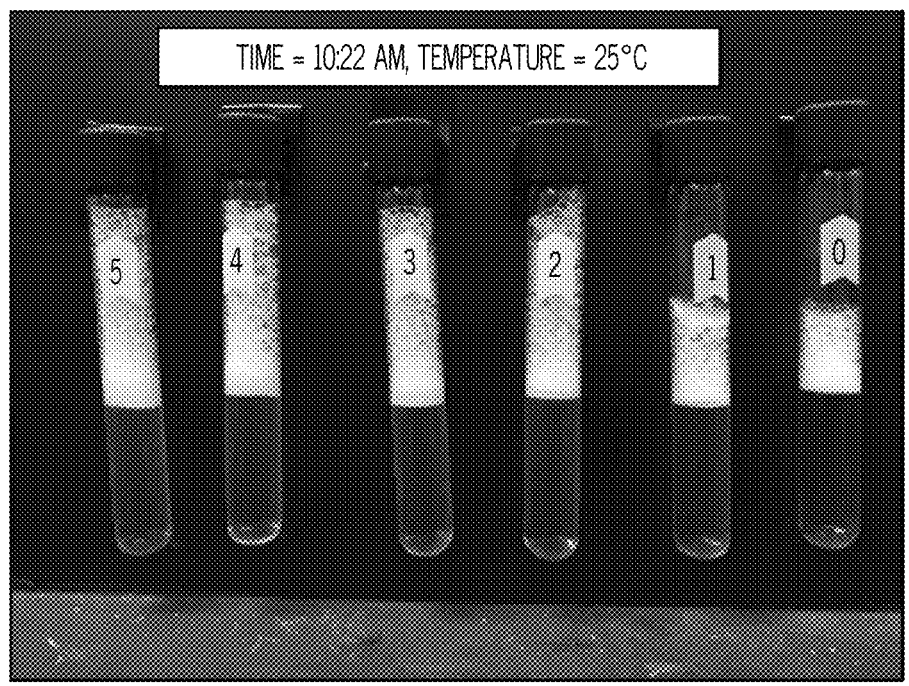
Figure 1C:
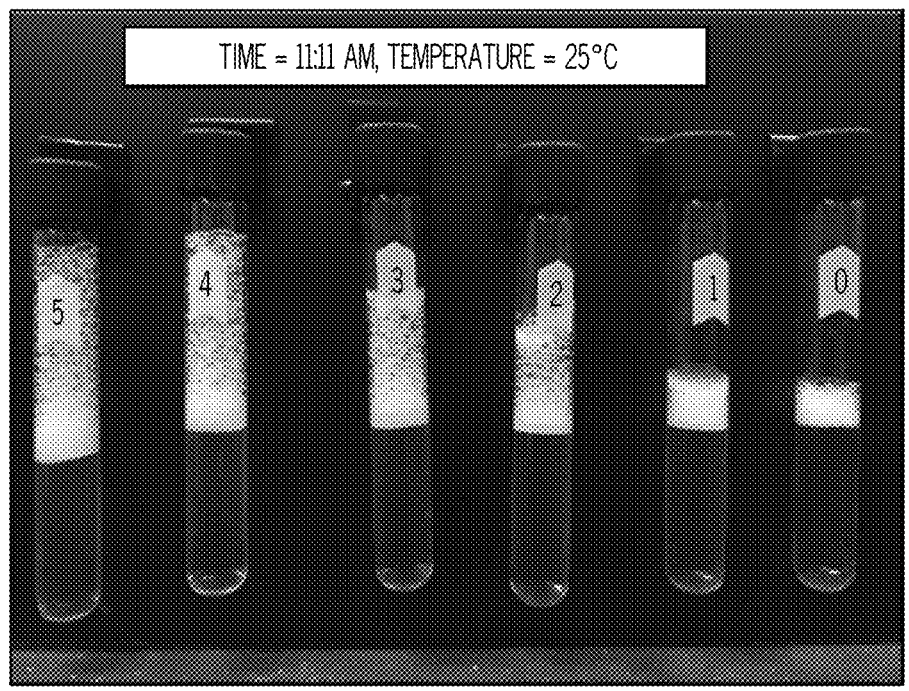
Figure 1D:
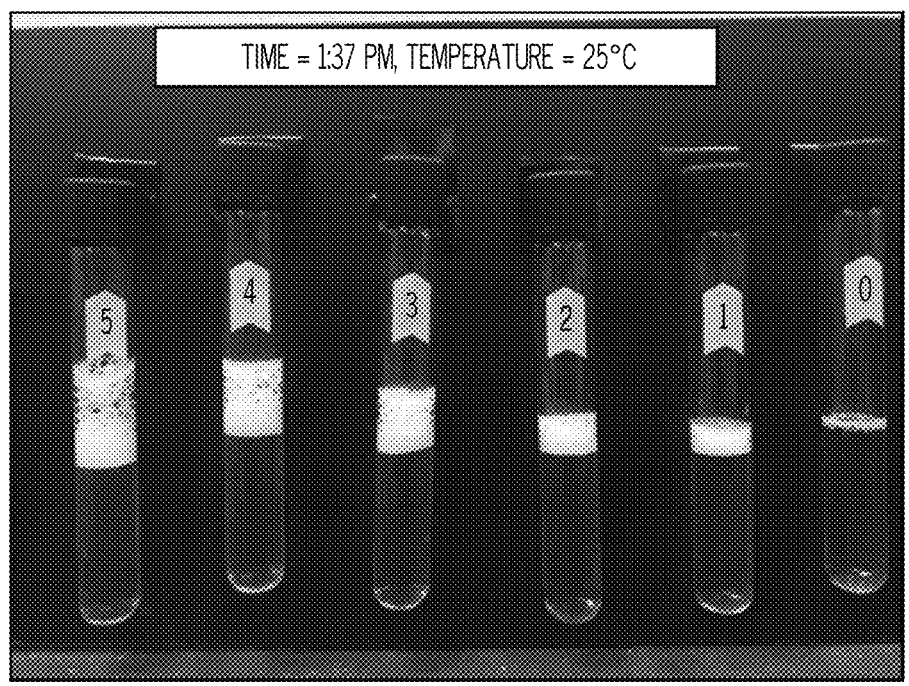

Images of foam columns at different times were captured and uploaded to Image-J software to measure foam height. FIGS. 1A-1D provide a photographic time-lapse of foams produced according to the above procedure at room temperature. Tubes 0-5 correspond to Sample Nos. 0-5, respectively. FIG. 1A provides an image of the foams immediately after shaking. FIG. 1B provides an image of the foams after being allowed to rest for about 1 hour. FIG. 1C provides an image of the foams after being allowed to rest for about 2 hours. FIG. 1D provides an image of the foams after being allowed to rest for about 4 hours.

Addition of jojoba oil to the formulation enhanced the foam texture, strength and improved resistance to degradation. All foams of FIG. 1A appear similarly well-formed. However, over the four hour period, the foam produced in Tube 0, having no jojoba oil, almost fully collapses. In contrast, the foams of Tubes 3-5 remain quite robust over that same period. Additionally, even a relatively small amount of jojoba oil helped to stabilize the foam somewhat, as is evident from contrasting Tubes 1 and 2 with Tube 0 in FIG. 1D. These foam heights were quantified, and a set of the resulting data is presented in FIG. 2.

Figure 2:
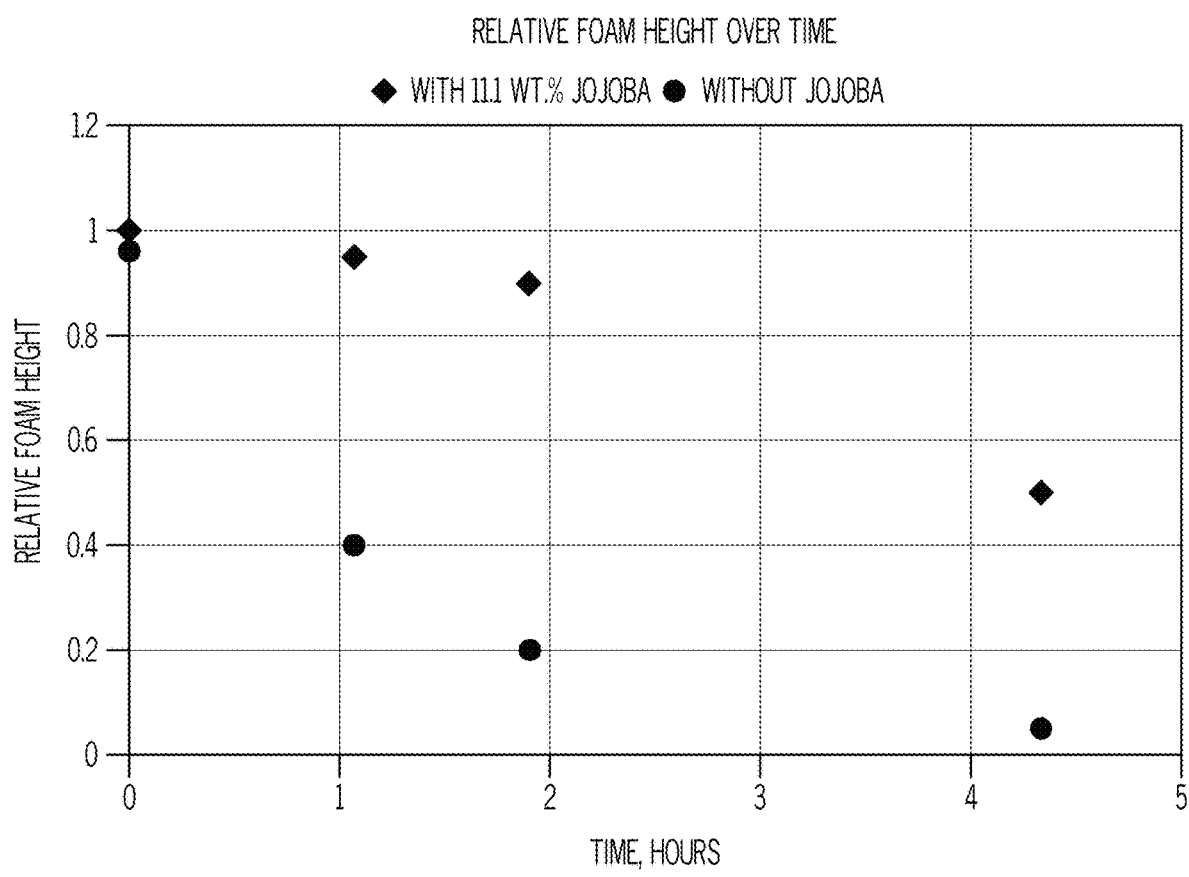
FIG. 2 is a chart of relative foam height (y-axis) vs. time in hours (x-axis) for Tube 0 of FIGS. 1A-1D (without jojoba oil) and Tube 5 (11.1 wt. % jojoba oil), according to one or more embodiments presently described.

FIG. 2 is a chart of relative foam height (y-axis) vs. time in hours (x-axis) for Tube 0 of FIG. 1A-1D (without jojoba oil) and Tube 5 (11.1 wt. % jojoba oil). When 11.1 wt. % jojoba oil is included, the half-life of the foam, defined as the time it takes for the foam to reach half of its initial height, is 4.33 hours. In contrast, when no jojoba oil is included, the foam half-life is less than one hour.

Figure 3:
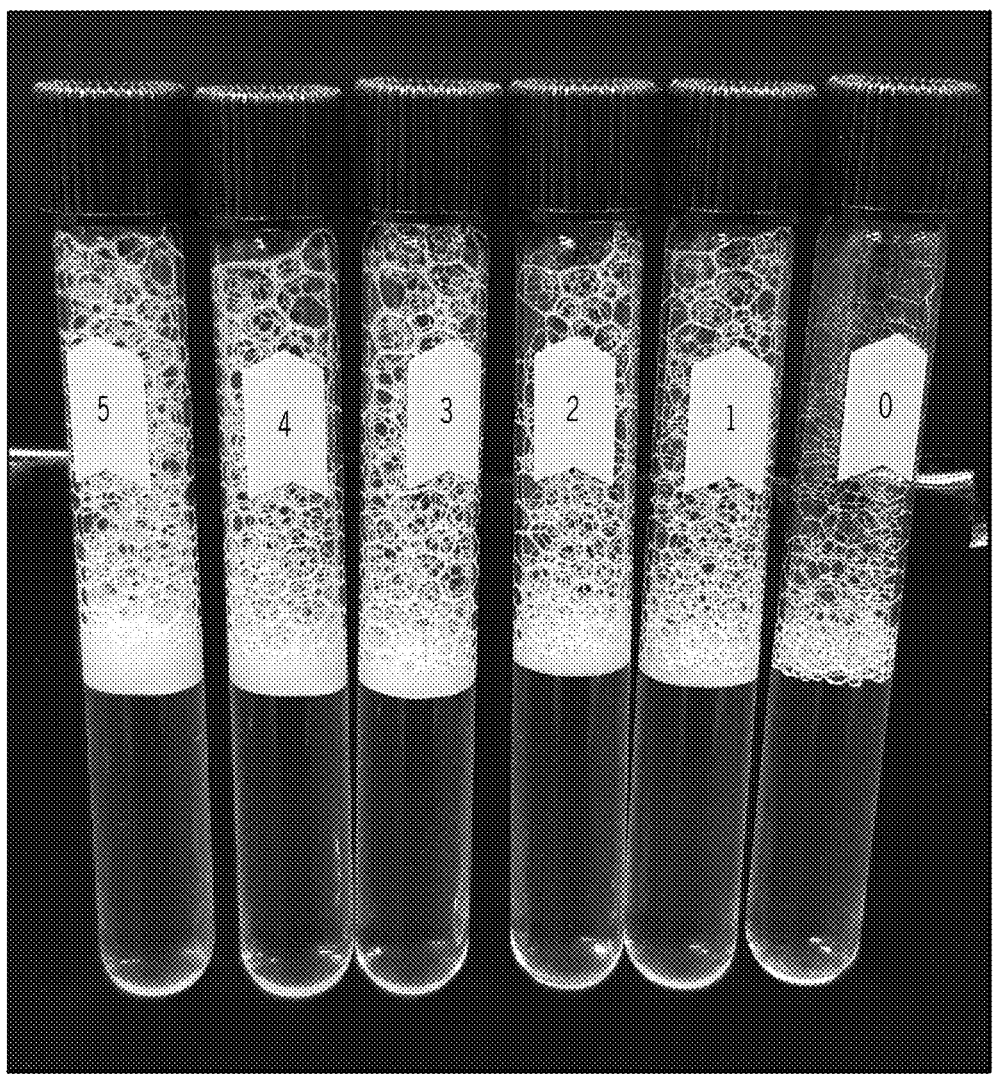
FIG. 3 is a photograph of foams produced and allowed to reach 50° C., according to one or more embodiments presently described.

Similar results were obtained when the foam was allowed to reach higher temperatures. For instance, FIG. 3 provides a photograph of foams formed and allowed to reach 50° C. Tubes 0-5 correspond to Sample Nos. 0-5, respectively, of Table 4. From an examination of FIG. 3, even a relatively small amount of jojoba oil helped to stabilize the foam, as is evident by contrasting the foam in Tube 1 with that in Tube 0. Additionally, as more jojoba oil was included, the foam became more robust. Contrast, for example, the foam of Tube 5 with the foam of Tube 1.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present subject matter, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A foam suitable for use in hydrocarbon recovery, the foam comprising:
   a gas phase; and
   a liquid phase comprising a foaming mixture, the foaming mixture comprising:
      an aqueous solution;
      one or more surfactants; and
      an oil mixture comprising at least 2 wt. % of the liquid phase, wherein the oil mixture comprises at least 11-eicosenoic acid, oleic acid, and eruic acid.

2. The foam of claim 1, wherein the oil mixture comprises:
   from 65 mol. % to 80 mol. % 11-eicosenoic acid;
   from 5 mol. % to 15 mol. % oleic acid; and
   from 10 mol. % to 20 mol. % erucic acid.

3. The foam of claim 1, wherein the oil mixture is all naturally derived jojoba oil or a portion of naturally derived jojoba oil.

4. The foam of claim 1, wherein the oil mixture is in a concentration of from 2 wt. % to 15 wt. % of the liquid phase.

5. The foam of claim 1, wherein one or more of the surfactants is an amphoteric alkyl amine.

6. The foam of claim 1, wherein one or more of the surfactants is an amphoteric alkyl amine and another one of the one or more surfactants is propan-2-ol.

7. The foam of claim 1, wherein the one or more surfactants is not a surfactant comprising Formula (I):

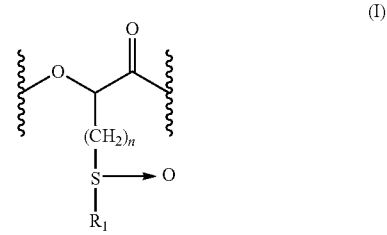

wherein:
   $R^1$ is alkyl, substituted alkyl, alkenyl, substituted alkenyl, aryl, or substituted aryl; and
   n is an integer from 1 to 20.

8. A method of recovering hydrocarbons from a deposit reservoir, the method comprising:
   contacting the deposit reservoir with a gas phase and a liquid phase;
   generating a foam comprising the gas phase and the liquid phase; and
   collecting the hydrocarbons displaced by the foam;
   wherein:
      the liquid phase comprises a foaming mixture, the foaming mixture comprising:
         an aqueous solution;
         one or more surfactants; and
         an oil mixture comprising at least 2 wt. % of the liquid phase, wherein the oil mixture comprises at least 11-eicosenoic acid, oleic acid, and eruic acid.

9. The method of claim 8, wherein the oil mixture is all naturally derived jojoba oil or a portion of naturally derived jojoba oil.

10. The method of claim 8, wherein one or more of the surfactants is an amphoteric surfactant.

11. The method of claim 8, wherein the one or more surfactants is not a surfactant comprising Formula (I):

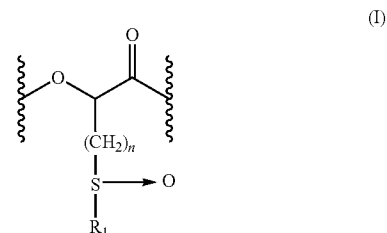

wherein:
   $R^1$ is alkyl, substituted alkyl, alkenyl, substituted alkenyl, aryl, or substituted aryl; and
   n is an integer from 1 to 20.

12. The method of claim 8, wherein the generating of the foam precedes the contacting of the deposit reservoir.

13. The method of claim 8, wherein the contacting of the deposit reservoir precedes the generating of the foam.

14. A hydrocarbon well comprising:
  a subsurface reservoir;
  a borehole; and
  a foam comprising:
    a gas phase; and
    a liquid phase comprising a foaming mixture, the foaming mixture comprising:
      an aqueous solution;
      one or more surfactants;
      an oil mixture comprising at least 2 wt. % of the liquid phase, wherein the oil mixture comprises at least 11-eicosenoic acid, oleic acid, and eruic acid.

15. The well of claim 14, wherein the oil mixture comprises:
  from 65 mol. % to 80 mol. % 11-eicosenoic acid;
  from 5 mol. % to 15 mol. % oleic acid; and
  from 10 mol. % to 20 mol. % erucic acid.

16. The well of claim 14, wherein the oil mixture is all naturally derived jojoba oil or a portion of naturally derived jojoba oil.

17. The well of claim 14, wherein the oil mixture is in a concentration of from 2 wt. % to 15 wt. % of the liquid phase.

18. The hydrocarbon well of claim 14, wherein the one or more surfactants is not a surfactant comprising Formula (I):

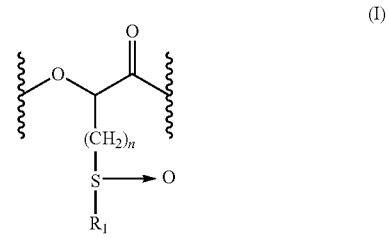

wherein:
  $R^1$ is alkyl, substituted alkyl, alkenyl, substituted alkenyl, aryl, or substituted aryl; and
  n is an integer from 1 to 20.

* * * * *